United States Patent
Yanagawa (10) Patent No.: US 9,887,569 B2
(45) Date of Patent: Feb. 6, 2018

(54) SEMICONDUCTOR DEVICE AND BATTERY MONITORING SYSTEM

(71) Applicant: LAPIS SEMICONDUCTOR CO., LTD., Kanagawa (JP)

(72) Inventor: Kenji Yanagawa, Kanagawa (JP)

(73) Assignee: LAPIS SEMICONDUCTOR CO., LTD., Kanagawa (JP)

( * ) Notice: Subject to any disclaimer, the term of this patent is extended or adjusted under 35 U.S.C. 154(b) by 204 days.

(21) Appl. No.: 14/887,350

(22) Filed: Oct. 20, 2015

(65) Prior Publication Data

US 2016/0118829 A1   Apr. 28, 2016

(30) Foreign Application Priority Data

Oct. 23, 2014  (JP) .................................. 2014-216648

(51) Int. Cl.
| | | |
|---|---|---|
| *H01M 10/46* | (2006.01) | |
| *H02J 7/00* | (2006.01) | |
| *H01M 10/48* | (2006.01) | |
| *H01M 10/42* | (2006.01) | |

(52) U.S. Cl.
CPC ....... *H02J 7/0063* (2013.01); *H01M 10/4257* (2013.01); *H01M 10/482* (2013.01); *H01M 2010/4271* (2013.01); *H02J 2007/0067* (2013.01)

(58) Field of Classification Search
CPC ...... H02J 7/1423; H02J 7/0013; H02J 7/0014; H02J 7/0022

USPC .................................. 320/107, 116, 128, 137
See application file for complete search history.

(56) References Cited

U.S. PATENT DOCUMENTS

| | | | |
|---|---|---|---|
| 8,154,253 B2* | 4/2012 | Omagari ............ | G01R 31/3624 320/116 |
| 2007/0182375 A1* | 8/2007 | Lee ........................ | H02J 7/0052 320/130 |
| 2014/0125274 A1* | 5/2014 | Kim ................... | H01M 10/4207 320/107 |
| 2014/0145682 A1* | 5/2014 | Kim ...................... | H02J 7/0022 320/135 |

FOREIGN PATENT DOCUMENTS

JP           2014-82152 A      5/2014

* cited by examiner

*Primary Examiner* — Edward Tso
(74) *Attorney, Agent, or Firm* — Kubotera & Associates, LLC (57) ABSTRACT

A semiconductor device includes a first electrical current source connected to an assembled battery through a power source terminal; and a second electrical current source connected to an input terminal to which an external electrical current is input. The first electrical current source is configured to generate a first electrical current according to a reference voltage based on a power source electrical current input into the power source terminal, and to output the first electrical current to an output terminal. The second electrical current source is configured to generate a second electrical current according to the reference voltage based on the external electrical current, and to output the second electrical current to the output terminal.

7 Claims, 6 Drawing Sheets

SEMICONDUCTOR DEVICE AND BATTERY MONITORING SYSTEM

BACKGROUND OF THE INVENTION AND RELATED ART STATEMENT

The present invention relates to a semiconductor device and a battery monitoring system.

According to a conventional technology, a plurality of battery cells is connected in series to constitute an assembled battery for generating a high voltage. In general, a conventional battery monitoring semiconductor device is provided for measuring and monitoring a battery voltage of the battery cells of the assembled battery.

A conventional battery monitoring system formed of the conventional battery monitoring semiconductor devices, for example, may include a plurality of assembled batteries, and the conventional battery monitoring semiconductor devices are connected in a daisy chain arrangement for monitoring each of the assembled batteries. The conventional battery monitoring system may further include a control unit for controlling each of the conventional battery monitoring semiconductor devices.

In the conventional battery monitoring system, a power source for an external load is provided as a separate device (a separate component) other than the control unit or the conventional battery monitoring semiconductor devices, and may be formed of a power source system separated from the conventional battery monitoring semiconductor devices. Alternatively, in order to reduce a size of the conventional battery monitoring semiconductor devices or the number of wiring portions, there has been proposed a conventional technology, in which a voltage generated in the conventional battery monitoring semiconductor devices is utilized as a power source voltage. According to such a conventional technology, it may be configured such that the power source voltage is supplied from only one of the conventional battery monitoring semiconductor devices that is directly connected to the control unit.

According to the conventional technology described above, when the power consumption of one of the conventional battery monitoring semiconductor devices supplying the power voltage is increased, the power consumption of the assembled batteries may exceed that of the other of the conventional battery monitoring semiconductor devices. Accordingly, a voltage balance among the assembled batteries may become unstable, thereby causing a fluctuation in the voltage of the assembled batteries.

Patent Reference has disclosed a conventional battery monitoring system for reducing the fluctuation in the voltage of the assembled batteries.

Patent Reference: Japanese Patent Publication No. 2014-82152

In the conventional battery monitoring system disclosed in Patent Reference, the conventional battery monitoring semiconductor devices are connected in the daisy chain arrangement, and one of the conventional battery monitoring semiconductor devices is capable of communicating with the control unit (a microcomputer) through an insulation I/F. When the one of the conventional battery monitoring semiconductor devices communicates with the control unit, the power consumption of the one of the conventional battery monitoring semiconductor devices is increased for supplying an electrical current to the insulation I/F. Accordingly, it is possible to reduce a difference in the power consumption of the other of the conventional battery monitoring semiconductor devices, thereby making it possible to reduce the fluctuation in the voltage of the assembled batteries.

In the conventional battery monitoring system disclosed in Patent Reference, when an external load electrical current for supplying the power source to the insulation I/F is fluctuated, however, it is difficult to maintain the power consumption at the constant level. Accordingly, it is difficult to effectively reduce the fluctuation in the voltage of the assembled batteries. Further, the power consumption of the assembled batteries may be increased to an excessive level.

In view of the problems of the conventional battery monitoring system described above, an object of the present invention is to provide a semiconductor device and a battery monitoring system capable of reducing power consumption and a fluctuation in a voltage of assembled batteries.

Further objects and advantages of the invention will be apparent from the following description of the invention.

SUMMARY OF THE INVENTION

In order to attain the objects described above, according to a first aspect of the present invention, a semiconductor device includes a first electrical current source connected to an assembled battery through a power source terminal and a second electrical current source connected to an input terminal to which an external electrical current is input.

According to the first aspect of the present invention, the first electrical current source is configured to generate a first electrical current according to a reference voltage based on a power source electrical current input into the power source terminal, and to output the first electrical current to an output terminal. Further, the second electrical current source is configured to generate a second electrical current according to the reference voltage based on the external electrical current, and to output the second electrical current to the output terminal.

According to a second aspect of the present invention, a battery monitoring system is a semiconductor device connected to other semiconductor device in a dairy chain arrangement. The battery monitoring system includes a plurality of semiconductor devices each having an output terminal connected to an input terminal of the other semiconductor device or an external device.

According to the present invention, with the semiconductor device, it is possible to reduce power consumption thereof and a fluctuation in a voltage of the assembled battery.

DETAILED DESCRIPTION OF PREFERRED EMBODIMENTS

Hereunder, preferred embodiments of the present invention will be explained with reference to the accompanying drawings. According to the present invention, a semiconductor device includes a battery monitoring system having a battery monitoring IC (Integrated Circuit).

First Embodiment

Figure 1:
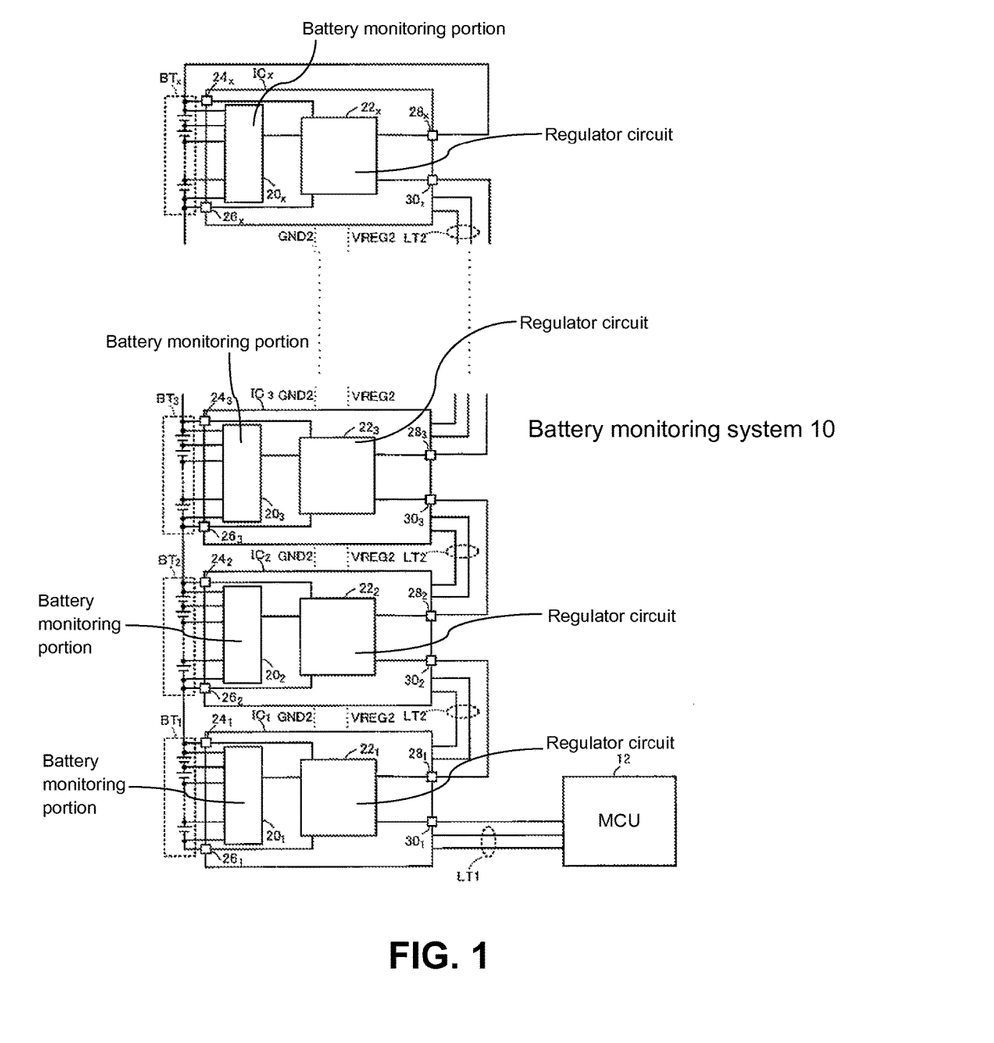
FIG. 1 is a block diagram showing a configuration of a battery monitoring system according to a first embodiment of the present invention.

A first embodiment of the present invention will be explained. FIG. 1 is a block diagram showing a configuration of a battery monitoring system 10 according to the first embodiment of the present invention.

As shown in FIG. 1, the battery monitoring system 10 includes assembled batteries BT1 to BT*x* in the number of x (x is a natural number greater than one); battery monitoring ICs (Integrated Circuit) IC1 to IC*x* in the number of x; and an MCU (Memory Control Unit) 12. It should be noted that, in the following description, the assembled batteries and the battery monitoring ICs are collectively referred to as the assembled batteries BT and the battery monitoring ICs IC, respectively. When it is necessary to differentiate each of the assembled batteries BT and the battery monitoring ICs IC, a specific number or symbol (1 to x) is attached to the legend (IC or BT).

In the first embodiment, each of the assembled batteries BT includes a plurality of battery cells. It should be noted that each of the assembled batteries BT may include the battery cells in an arbitrarily number. For example, each of the assembled batteries BT may include the battery cells in the same number, or each of the assembled batteries BT may include the battery cells in a different number. The battery cells included in the assembled batteries BT are connected in series. Further, the battery cells include, for example, a nickel-metal hydride battery and a lithium ion battery.

In the first embodiment, the MCU (Memory Control Unit) 12 is configured to control the battery monitoring system 10 as a whole, so that the battery monitoring ICs IC measure and monitor a battery voltage of the battery cells of the assembled batteries BT.

In the first embodiment, the battery monitoring ICs IC have a function of monitoring the battery voltage of the battery cells assembled in the assembled batteries BT. As shown in FIG. 1, in the battery monitoring system 10, each of the battery monitoring ICs IC is connected in series in a daisy chain arrangement through communication lines LT2. Further, the battery monitoring ICs IC include the battery monitoring IC IC1 at the lowest stage and the battery monitoring IC IC*x* at the highest stage. The battery monitoring IC IC1 at the lowest stage is connected to the MCU (Memory Control Unit) 12 through communication lines LT1, so that the battery monitoring IC IC1 can communicate with the MCU (Memory Control Unit) 12 to transfer data. It should be noted that the battery monitoring ICs IC at upper stages can communicate with the MCU (Memory Control Unit) 12 to transfer data through the battery monitoring ICs IC at lower stages and the communication lines LT2.

In the first embodiment, each of the battery monitoring ICs IC includes a communication unit (not shown) for mutually communicating with each other through the communication lines LT1 or the communication lines LT2. It should be noted that the battery monitoring ICs IC at upper stages generate a drive voltage VREG2 and a ground voltage GND2 as power source for communication, and supply the drive voltage VREG2 and the ground voltage GND2 to the battery monitoring ICs IC at lower stages.

As shown in FIG. 1, the battery monitoring ICs IC include power source terminals 241 to 24*x*; ground terminals 261 to 26*x*; input terminals 281 to 28*x*; and output terminals 301 to 30*x*. It should be noted that, in the following description, similar to the assembled batteries BT and the battery monitoring ICs IC, the power source terminals, the ground terminals, the input terminals, and the output terminals are collectively referred to as the power source terminals 24, the ground terminals 26, the input terminals 28, and the output terminals 30, respectively. When it is necessary to differentiate each of the power source terminals 24, the ground terminals 26, the input terminals 28, and the output terminals 30, a specific number or symbol (1 to x) is attached to the legend (24, 26, 28, or 30).

In the first embodiment, one of the battery cells on the highest potential side in the assembled battery BT is connected to the power source terminal 24. A power source voltage VDD is supplied into the power source terminal 24 from the assembled battery BT. Further, one of the battery cells on the lowest potential side in the assembled battery BT is connected to the ground terminal 26. A ground voltage GND is supplied into the ground terminal 26 from the assembled battery BT.

In the first embodiment, the input terminals 28 are connected to the output terminals 30 of the battery monitoring ICs IC at upper stages. An external electrical current (described later) is input into the input terminals 28 from the battery monitoring ICs IC at upper states. It should be noted that the battery monitoring IC IC*x* at the highest stage does not have a battery monitoring IC at an upper stage. Accordingly, the input terminal 28 of the battery monitoring IC IC*x* at the highest stage is connected to the highest potential side of the assembled battery BT*x*.

In the first embodiment, the output terminals 30 are connected to the input terminals 28 of the battery monitoring ICs IC at lower stages. The external electrical current is output from the output terminals 30. It should be noted that the output terminal 30 of the battery monitoring IC IC1 at the lowest stage is connected to the MCU (Memory Control Unit) 12.

As shown in FIG. 1, the battery monitoring ICs IC further include battery monitoring portions 201 to 20*x* and regulator circuits 221 to 22*x*. It should be noted that, in the following description, similar to the assembled batteries BT and the battery monitoring ICs IC, the battery monitoring portions and the regulator circuits are collectively referred to as the battery monitoring portions 20 and the regulator circuits 22, respectively. When it is necessary to differentiate each of the battery monitoring portions 20 and the regulator circuits 22, a specific number or symbol (1 to x) is attached to the legend (20 or 22).

In the first embodiment, the assembled batteries BT are connected to the battery monitoring portions 20, and the battery monitoring portions 20 have a function of measuring (monitoring) the battery voltage of the assembled batteries BT. The battery monitoring portions 20 may have a configuration having switching elements in a number corresponding to the number of the battery cells. In this case, the switching elements of the battery monitoring portions 20 are configured to select between a battery voltage line connected to the high potential side and a battery voltage line connected to the low potential side of the battery cells as an object of measuring (monitoring) of the battery voltage. Accordingly, the battery monitoring portions 20 are configured to measure (monitor) the battery voltage of the battery cells as the object of measuring (monitoring) according to a potential of the battery voltage line connected to the high potential side and a potential of the battery voltage line connected to the low potential side of the battery cells. A measurement (monitoring) result of the battery monitoring portions 20 is output to the MCU (Memory Control Unit) 12 through the communication lines LT1. More specifically, the measurement result of the battery monitoring ICs IC at upper stages is output to the MCU (Memory Control Unit) 12 through the communication lines LT2 and the battery monitoring ICs IC at lower stages.

In the first embodiment, the regulator circuits 22 have a function of generating a drive voltage VREG of an internal circuit such as the battery monitoring portions 20 from the power source voltage supplied from the assembled batteries BT, so that the regulator circuits 22 supply the drive voltage VREG to each component. Further, the drive voltage VREG generated with the regulator circuits 22 is supplied to an external load 14 (refer to FIG. 3) as a device (a component) other than the MCU (Memory Control Unit) 12 and the battery monitoring ICs IC disposed inside the battery monitoring system 10. Accordingly, the regulator circuits 22 are configured to function as a power source of the external load 14.

Figure 2:
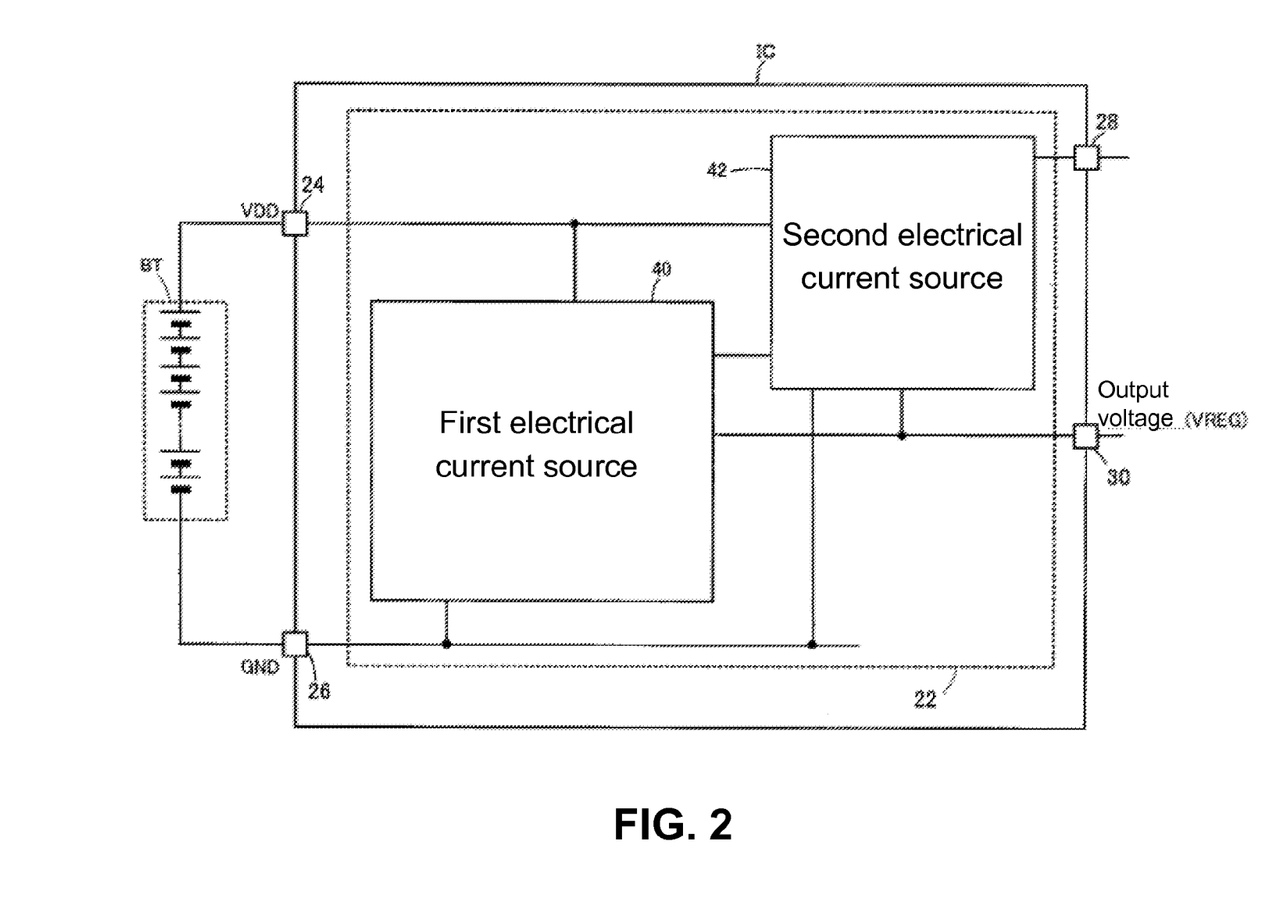
FIG. 2 is a block diagram showing a configuration of a regulator circuit of the battery monitoring system according to the first embodiment of the present invention.

The regulator circuit 22 will be explained in more detail next. First, a configuration of the regulator circuits 22 will be explained. FIG. 2 is a block diagram showing the configuration of the regulator circuit 22 of the battery monitoring system 10 according to the first embodiment of the present invention.

As shown in FIG. 2, the regulator circuit 22 includes a first electrical current source 40 and a second electrical current source 42. The first electrical current source 40 is connected to the power source terminal 24, and includes a reference voltage source Vref (refer to FIG. 3). Further, the first electrical current source 40 has a function of generating a first electrical current from a power source electrical current supplied from the assembled batteries BT through the power source terminals 24, and a function of outputting the first electrical current outside (the battery monitoring IC at a lower stage or the external load 14).

In the first embodiment, the second electrical current source 42 is connected to the input terminal 28. Further, the second electrical current source 42 has a function of generating a second electrical current from an external electrical current supplied from the battery monitoring IC at an upper stage through the input terminal 28, and a function of outputting the second electrical current outside (the battery monitoring IC at a lower stage or the external load 14).

In the first embodiment, the regulator circuit 22 is configured to supply the first electrical current generated with the first electrical current source 40 and the second electrical current generated with the second electrical current source 42 of each of the battery monitoring ICs IC, or the first electrical current generated with the first electrical current source 40 to the external load 14 through the output terminal 30 as an external load electrical current Iload.

Figure 3:
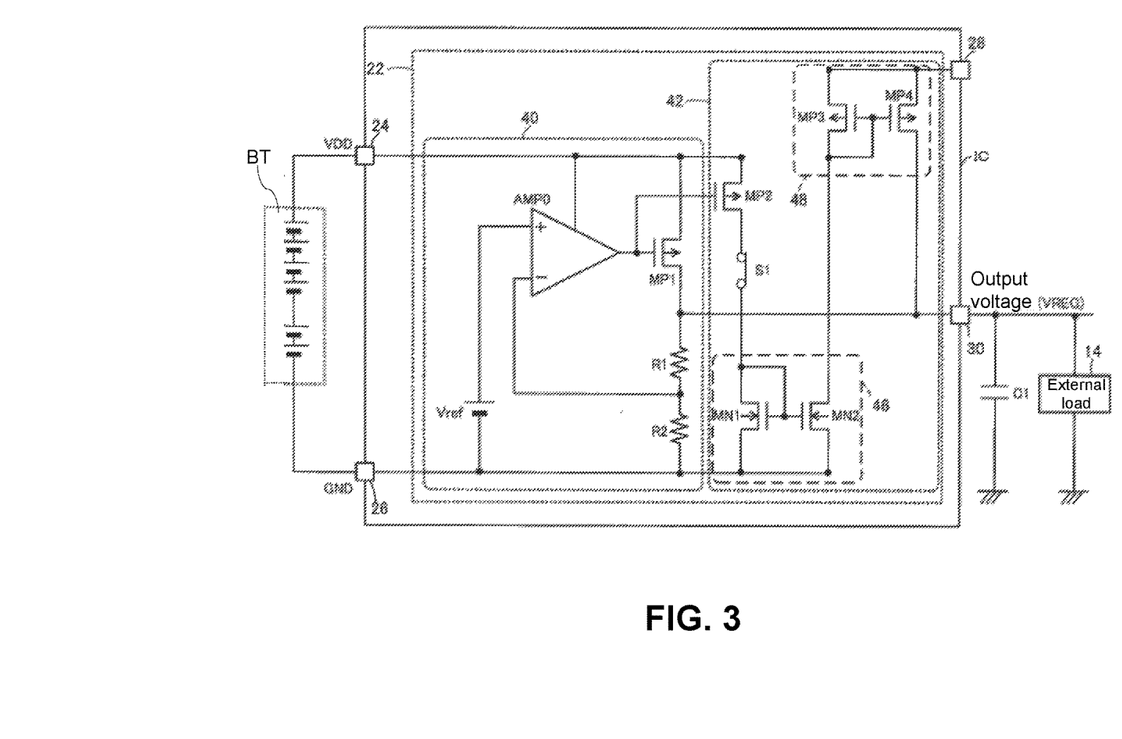
FIG. 3 is a circuit diagram showing a configuration of the regulator circuit of the battery monitoring system according to the first embodiment of the present invention.

The regulator circuit 22 will be explained further in more detail next. FIG. 3 is a circuit diagram showing the configuration of the regulator circuit 22 of the battery monitoring system 10 according to the first embodiment of the present invention.

As shown in FIG. 3, the first electrical current source 40 includes the reference voltage source Vref; a differential amplifier AMP0; a PMOS transistor MP1; a resistor element R1; and a resistor element R2. Further, the second electrical current source 42 includes a PMOS transistor MP2; a switch S1; a current mirror circuit 46 formed of an NMOS transistor MN1 and an NMOS transistor MN2; and a current mirror circuit 48 formed of a PMOS transistor MP3 and a PMOS transistor MP4.

In the first embodiment, a non-inversion input terminal of the differential amplifier AMP0 is connected to the reference voltage source Vref. Further, an inversion input terminal of the differential amplifier AMP0 is connected to a node of the resistor element R1 and the resistor element R2 connected in series. Further, an output terminal of the differential amplifier AMP0 is connected to gate terminals (control terminals) of the PMOS transistor MP1 and the PMOS transistor MP2.

In the first embodiment, the differential amplifier AMP0 has a function of controlling the PMOS transistor MP1 and the PMOS transistor MP2 to turn on or off according to a reference voltage supplied from the reference voltage source Vref. When the regulator circuit 22 generates the drive voltage VREG, the differential amplifier AMP0 controls the PMOS transistor MP1 and the PMOS transistor MP2 to turn on.

In the first embodiment, the gate terminal of the PMOS transistor MP1 is connected to the output terminal of the differential amplifier AMP0 and the gate terminal of the PMOS transistor MP2. A source terminal (a main terminal) of the PMOS transistor MP1 is connected to the power source terminal 24. Further, a drain terminal (a main terminal) of the PMOS transistor MP1 is connected to a positive side terminal of the resistor element R1 and the output terminal 30.

In the first embodiment, the resistor element R1 is connected to the resistor element R2 in series. The positive side terminal of the resistor element R1 is connected to the drain terminal of the PMOS transistor MP1 and the output terminal 30. Further, a negative side terminal of the resistor element R1 is connected to a positive side terminal of the resistor element R2. A negative side terminal of the resistor element R2 is connected to the ground terminal 26.

In the first embodiment, the gate terminal of the PMOS transistor MP2 is connected to the output terminal of the differential amplifier AMP0 and the gate terminal of the PMOS transistor MP1. A source terminal of the PMOS transistor MP2 is connected to the power source terminal 24. The one of the terminals of the switch S1 is connected to the drain terminal of the PMOS transistor MP2. The other one of the terminals of the switch S1 is connected to the drain terminal of the NMOS transistor MN1.

In the first embodiment, the NMOS transistor MN1 and the NMOS transistor MN2 constitute the current mirror circuit 46 as an example of a first current mirror circuit. A gate terminal of the NMOS transistor MN1 is connected to a drain terminal of the NMOS transistor MN1 and a gate terminal of the NMOS transistor MN2. A drain terminal of the NMOS transistor MN1 is connected to the other one of the terminals of the switch S1, the gate terminal of the NMOS transistor MN1, and the gate terminal of the NMOS transistor MN2. A source terminal of the NMOS transistor MN1 is connected to the ground terminal 26.

In the first embodiment, the gate terminal of the NMOS transistor MN2 is connected to the drain terminal and the gate terminal of the NMOS transistor MN1. A drain terminal of the NMOS transistor MN2 is connected to the drain terminal of the PMOS transistor MP3. A source terminal of the NMOS transistor MN2 is connected to the ground terminal 26.

In the first embodiment, the PMOS transistor MP3 and the PMOS transistor MP4 constitute the current mirror circuit 48 as an example of a second current mirror circuit. A gate terminal of the PMOS transistor MP3 is connected to a drain terminal of the PMOS transistor MP3 and a gate terminal of the PMOS transistor MP4. A source terminal of the PMOS transistor MP3 is connected to the input terminal 28. A drain terminal of the PMOS transistor MP3 is connected to the drain terminal of the NMOS transistor MN2, the gate terminal of the PMOS transistor MP3, and the gate terminal of the PMOS transistor MP4.

In the first embodiment, the gate terminal of the PMOS transistor MP4 is connected to the drain terminal and the gate terminal of the PMOS transistor MP3. A source terminal of the PMOS transistor MP4 is connected to the input terminal 28. A drain terminal of the PMOS transistor MP4 is connected to the output terminal 30.

Accordingly, the battery monitoring IC at an upper stage (more specifically, the output terminal 30 of the battery monitoring IC at an upper stage) is connected to the source terminals of the PMOS transistor MP3 and the PMOS transistor MP4 through the input terminal 28.

It should be noted that the output terminal 30 of the battery monitoring IC at the lowest stage (the battery monitoring IC IC1) is connected to the external load 14 and a capacitor C1 as shown in FIG. 3. Further, the output terminal 30 of each of the battery monitoring ICs at upper stages (the battery monitoring ICs IC2 to ICx) is connected to the input terminal 28 of the battery monitoring IC at a lower stage and the capacitor C1.

Figure 4:
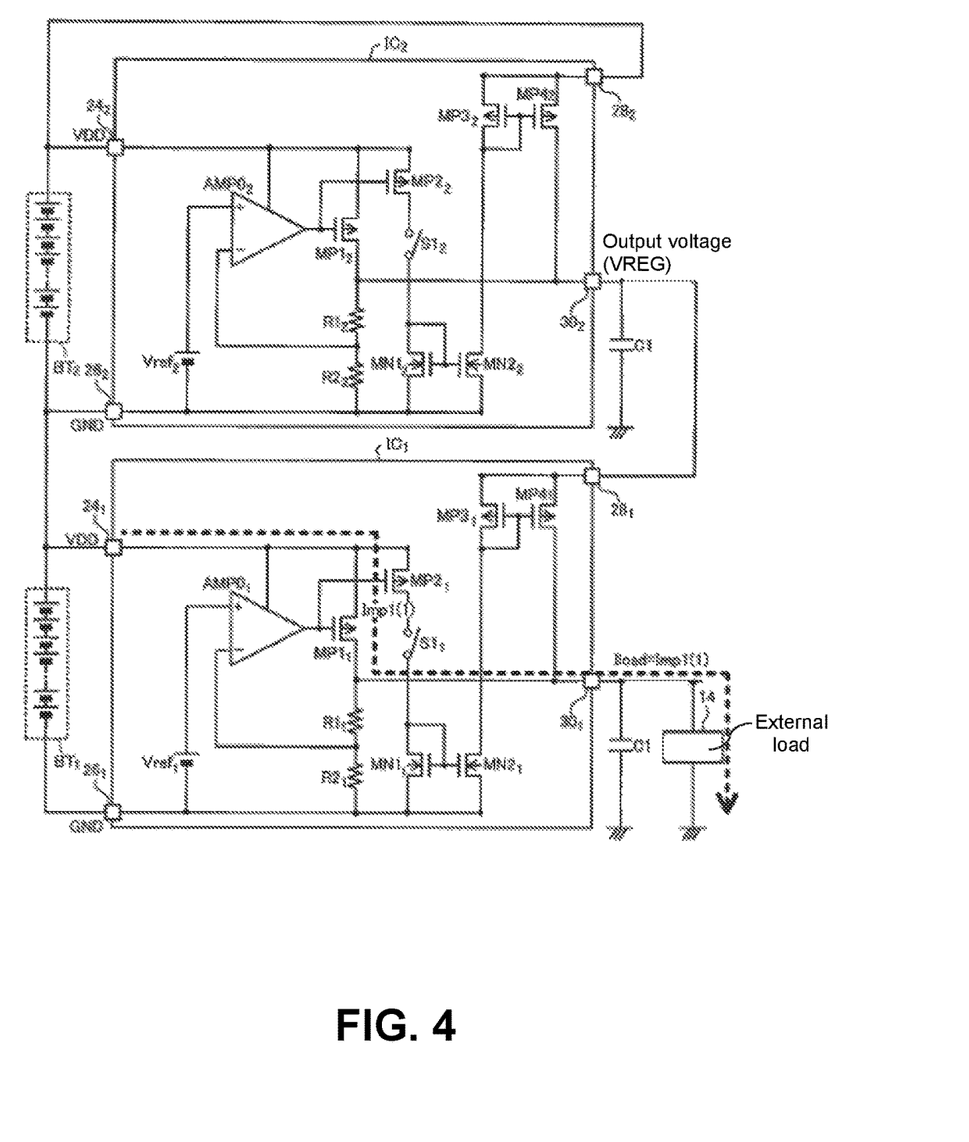
FIG. 4 is a circuit diagram showing an operation of the battery monitoring system when a switch of a battery monitoring IC (Integrated Circuit) at a lower stage is turned off according to the first embodiment of the present invention.
Figure 5:
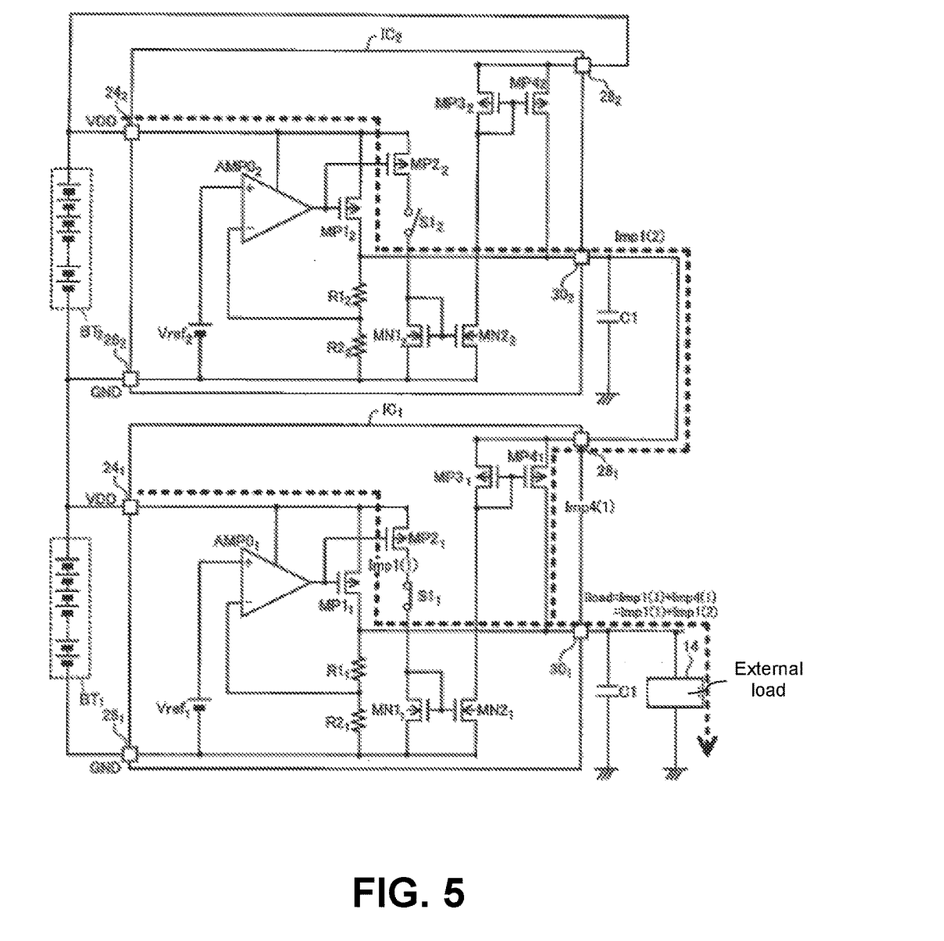
FIG. 5 is a circuit diagram showing an operation of the battery monitoring system when the switch of the battery monitoring IC at the lower stage is turned on according to the first embodiment of the present invention.

An operation of the regulator circuit 22 of the battery monitoring IC will be explained next with reference to FIGS. 4 and 5. In the following description, for the sake of simple explanation, it is assumed that x is equal to two (x=2) in the battery monitoring system 10 shown in FIG. 1.

In the following description, it is noted that the electrical currents flowing through the PMOS transistor MP1, the PMOS transistor MP2, the PMOS transistor MP3, and the PMOS transistor MP4 are designated as an electrical current Imp1, an electrical current Imp2, an electrical current Imp3, and an electrical current Imp4, respectively. Further, it is noted that the electrical currents flowing through the NMOS transistor MN1 and the NMOS transistor MN2 are designated as an electrical current Imn1 and an electrical current Imn2, respectively. When it is necessary to distinguish each of the electrical currents flows through which of the battery monitoring ICs, the number representing the stage of the battery monitoring IC in parenthesis is added to the legend of the electrical current after the legend.

In the first embodiment, the power source terminal 241 of the battery monitoring IC IC1 at the lower stage is connected to the high potential side of the assembled battery BT1. Further, the ground terminal 261 of the battery monitoring IC IC1 at the lower stage is connected to the low potential side of the assembled battery BT1. Accordingly, the power source electrical current is supplied from the assembled battery BT1 to the battery monitoring IC IC1.

Similarly, the power source terminal 242 of the battery monitoring IC IC2 at the upper stage is connected to the high potential side of the assembled battery BT2. Further, the ground terminal 262 of the battery monitoring IC IC2 at the upper stage is connected to the low potential side of the assembled battery BT2. Accordingly, the power source voltage is supplied from the assembled battery BT2 to the battery monitoring IC IC2.

In the first embodiment, the input terminal 281 of the battery monitoring IC IC1 at the lower stage is connected to the output terminal 302 of the battery monitoring IC IC2 at the upper stage. Further, the output terminal 301 of the battery monitoring IC IC1 is connected to the external load 14. Further, the input terminal 282 of the battery monitoring IC IC2 is connected to the high potential side of the assembled battery BT2.

First, the operation of the battery monitoring system 10 when the switch S11 of the battery monitoring IC IC1 at the lower stage is turned off will be explained. FIG. 4 is a circuit diagram showing an operation of the battery monitoring system 10 when the switch S11 of the battery monitoring IC IC1 at the lower stage is turned off according to the first embodiment of the present invention. It should be noted that the switch S1 may be configured to turn on or off according to an instruction from the MCU (Micro Controller Unit) 12. Alternatively, the switch S11 may be configured to turn on or off according to an instruction from other device (an external device or an internal device).

In the first embodiment, when the switch S11 is turned off, the electrical current Imp2(1) does not flow through the PMOS transistor MP21, and the electrical current Imn1(1) does not flow through the NMOS transistor MN11. Accordingly, in the current mirror circuit 461, the electrical current Imn2(1) does not flow through the NMOS transistor MN21 as well.

Further, the electrical current Imn2(1) does not flow through the NMOS transistor MN21, so that the electrical current Imp3(1) does not flow through the PMOS transistor MP31. Accordingly, in the current mirror circuit 481, the electrical current Imp4(1) does not flow through the PMOS transistor MP41 as well.

As described above, when the switch S11 is turned off, the second electrical current source 42 does not operate. Accordingly, the external load electrical current Iload is supplied only from the first electrical current source 40. More specifically, the external load electrical current Iload is supplied only from the PMOS transistor MP11. Accordingly, the external load electrical current Iload is equal to the electrical current Imp1(1) flowing through the PMOS transistor MP11. As a result, the external load electrical current Iload is supplied only from the assembled battery BT1 connected to the battery monitoring IC IC1.

Next, the operation of the battery monitoring system 10 when the switch S11 of the battery monitoring IC IC1 at the lower stage is turned on will be explained. FIG. 5 is a circuit diagram showing an operation of the battery monitoring system 10 when the switch S11 of the battery monitoring IC IC1 at the lower stage is turned on according to the first embodiment of the present invention. It is assumed that the switch S12 of the battery monitoring IC IC2 at the upper state is turned off.

In the first embodiment, when the switch S11 is turned on, the electrical current Imp2(1) flows through the PMOS transistor MP21 based on the power source electrical current supplied from the power source terminal 241. Further, the electrical current Imp1(1) flows through the PMOS transistor MP11.

As described above, the control terminals of the PMOS transistor MP21 and the PMOS transistor MP11 are connected to the output terminal of the differential amplifier AMP01. Accordingly, an electrical current ratio of the electrical current Imp1(1) and the electrical current Imp2(1)

(electrical current values of each electrical current) becomes a ratio according to a mirror ratio. When it is assumed that gate lengths of the PMOS transistor MP11 and the PMOS transistor MP21 are identical, the mirror ratio is determined by an area ratio of the PMOS transistor MP11 and the PMOS transistor MP21. Accordingly, when the ratio of the electrical current Imp1(1) flowing through the PMOS transistor MP11 and the electrical current Imp2(1) flowing through the PMOS transistor MP21 is assumed to be 1:m (the mirror ratio is m), the following equation is established:

Electrical current Imp2(1)=$m$×Electrical current Imp1(1)

In the first embodiment, when the electrical current Imp2(1) flows through the PMOS transistor MP21, the electrical current Imn1(1) flows through the NMOS transistor MN11. Accordingly, the following equation is established:

Electrical current Imn1(1)=Electrical current Imp2(1)= $m$×Electrical current Imp1(1)

Accordingly, in the current mirror circuit 461, when the ratio of the electrical current Imn1(1) flowing through the NMOS transistor MN11 and the electrical current Imn2(1) flowing through the NMOS transistor MN21 is assumed to be 1:n (the mirror ratio is n), the following equation is established:

Electrical current Imn2(1)=$n$×Electrical current Imp1(1)

In the first embodiment, when the electrical current Imn2(1) flows through the NMOS transistor MN21, the electrical current Imp3(1) flows through the PMOS transistor MP31. Accordingly, the following equation is established:

Electrical current Imp3(1)=Electrical current Imn2(1)= $m$×Electrical current Imp1(1)

Accordingly, in the current mirror circuit 481, when the ratio of the electrical current Imp3(1) flowing through the PMOS transistor MP31 and the electrical current Imp4(1) flowing through the PMOS transistor MP41 is assumed to be 1:k (the mirror ratio is k), the following equation is established:

Electrical current Imp4(1)=$k$×Electrical current Imp3(1)=$k$×$n$×$m$×Electrical current Imp1(1)

As described above, the switch S12 of the battery monitoring IC IC2 is turned off. Accordingly, similar to the case that the switch S11 of the battery monitoring IC IC1 is turned off, the second electrical current source 42 does not operate, and only the electrical current Imp1(2) flows through the PMOS transistor MP12. Accordingly, the battery monitoring IC IC2 consumes the electrical current of the assembled battery BT2. Further, the electrical current Imp1(2) is supplied as the external electrical current to the input terminal 281 of the battery monitoring IC IC1 at the lower stage through the output terminal 302. Accordingly, the electrical current Imp1(2) of the battery monitoring IC IC2 at the upper stage becomes equal to the electrical current Imp4(1) of the battery monitoring IC IC1 at the lower stage.

In the first embodiment, the external load electrical current Iload becomes a sum of the first electrical current output from the first electrical current source 40 and the second electrical current output from the second electrical current source 42. It should be noted that the first electrical current output from the first electrical current source 40 is equal to the electrical current Imp1(1), and the second electrical current output from the second electrical current source 42 is equal to the electrical current Imp4(1). Accordingly, the external load electrical current Iload is given by the following equation:

External load electrical current Iload=Electrical current Imp1(1)+Electrical current Imp4(1)=Electrical current Imp1(1)+Electrical current Imp1(2)

Accordingly, when the mirror ratio (the electrical current ration of each transistor) is satisfied the following equation:

$k$×$n$×$m$=1 the following equation is satisfied:

Electrical current Imp1(1)=Electrical current Imp4(1)= Electrical current Imp1(2)

Accordingly, in the first embodiment, in the battery monitoring IC IC1 and the battery monitoring IC IC2, it is possible to equally share the external load electrical current Iload. In other words, the electrical current consumption of the assembled battery BT1 is equal to the electrical current consumption of the assembled battery BT2.

As described above, in the first embodiment, the battery monitoring system 10 includes the battery monitoring IC IC1 and the battery monitoring IC IC2 disposed at the two stages. The present invention is not limited to the configuration. When the battery monitoring ICs IC are disposed at the stages in the number of x as shown in FIG. 1, it is configured such that the switch S$ix$ of the battery monitoring IC IC$x$ at the upper most stage (the x stage) is turned off, and the switches S11 to S1$x$−1 of the other battery monitoring ICs IC1 to IC$x$−1 are turned on.

In the first embodiment, the electrical current Imp4 flowing through the PMOS transistor MP4 in each of the battery monitoring ICs IC is equal to a sum of the electrical current Imp1 flowing through the PMOS transistor MP1 in all of the battery monitoring ICs IC disposed at upper stages. Accordingly, in each of the battery monitoring ICs IC, when the number of the battery monitoring ICs IC at upper states is set to the product of the mirror ratios (k×n×m), it is possible to maintain the electrical current consumption of the assembled batteries BT connected to each of the battery monitoring ICs IC at the same level.

More specifically, for example, when the number of the stages of the battery monitoring ICs IC is three, the product of the mirror ratios (k×n×m) is set to two in the battery monitoring IC IC1 at the lowest stage, and the product of the mirror ratios (k×n×m) is set to one in the battery monitoring IC IC2 at the middle stage. It should be noted that, in the battery monitoring ICs IC3 at the highest stage, the switch S11 is turned off, and the product of the mirror ratios (k×n×m) is set to an arbitrary number. Further, when the product of the mirror ratios (k×n×m) is set to one, each of the mirror ratios (k, n, and m) may be set to an arbitrary number.

Second Embodiment

A second embodiment of the present invention will be explained next. When the battery monitoring system 10 includes the battery monitoring ICs IC at a plurality of states, each of the battery monitoring ICs IC may includes a setting portion for setting the product of the mirror ratios (k×n×m), that is the electrical current ratio of each transistor.

Figure 6:
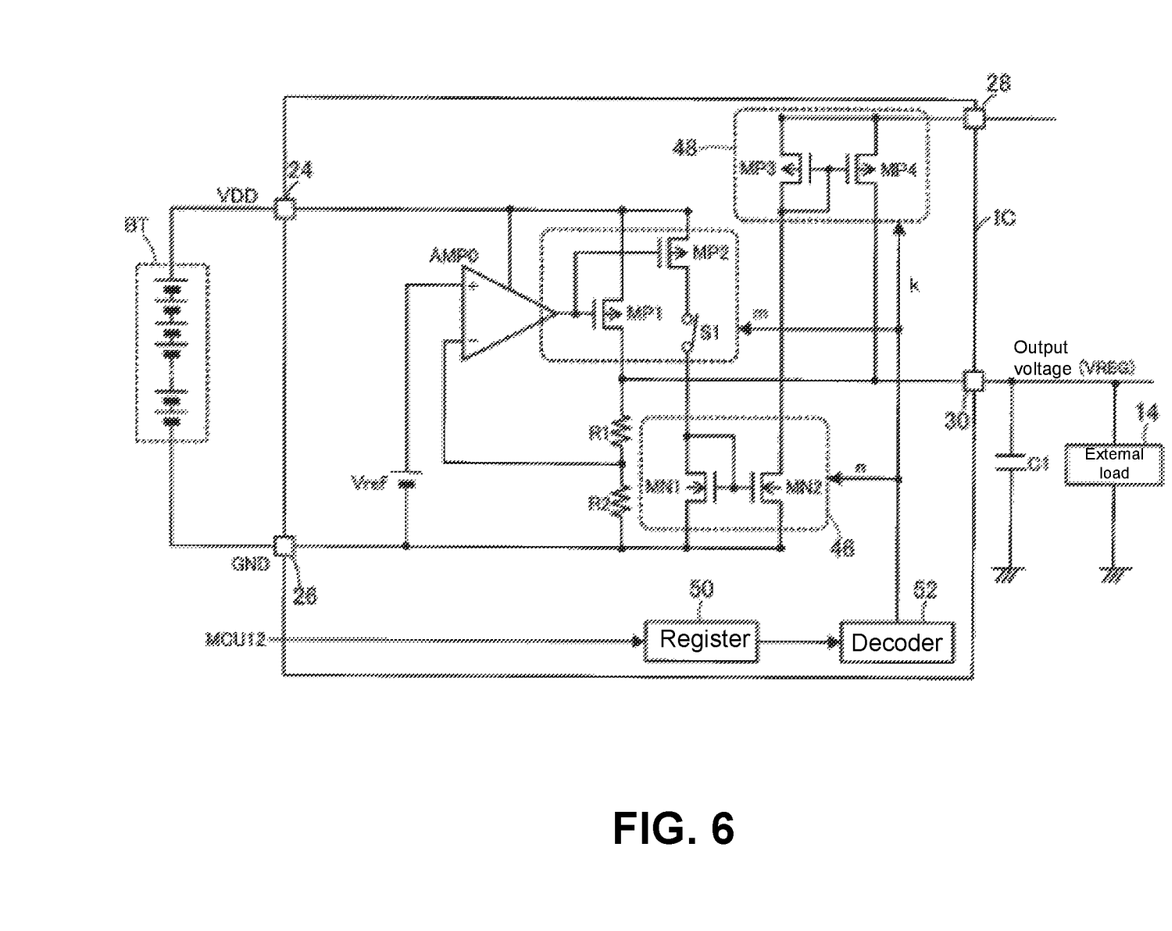
FIG. 6 is a circuit diagram showing a configuration of a battery monitoring IC (Integrated Circuit) of a battery monitoring system in which a setting portion is provided for setting a mirror ratio according to a second embodiment of the present invention.

FIG. 6 is a circuit diagram showing a configuration of the battery monitoring IC (Integrated Circuit) of the battery monitoring system 10 in which the setting portion is provided for setting the mirror ratios according to the second embodiment of the present invention.

As shown in FIG. 6, in addition to the configuration of the battery monitoring ICs IC in the first embodiment (refer to FIG. 3), each of the battery monitoring ICs IC includes a register 50 and a decoder 52 that function as the setting portion. It is configured such that the MCU (Memory Control Unit) 12 transmits an instruction to the register 50 to set the product of the mirror ratios (k×n×m) or each of the mirror ratios (k, n, and m) as setting values according to the total number of the stages of the battery monitoring ICs IC and the number of the stages of each of the battery monitoring ICs IC.

In the second embodiment, the decoder 52 is configured to decode the setting values set in the register 50 to generate a mirror ratio selection signal. The mirror ratio selection signal generated with the decoder 52 is transmitted to the PMOS transistor MP1, the PMOS transistor MP2, the current mirror circuit 46, and the current mirror circuit 48, so that the PMOS transistor MP1, the PMOS transistor MP2, the current mirror circuit 46, and the current mirror circuit 48 set the mirror ratios (k, n, and m).

As described above, in the configuration in the second embodiment shown in FIG. 6, each of the battery monitoring ICs IC includes the register 50 and the decoder 52 as the setting portion, and the MCU (Memory Control Unit) 12 controls the register 50 and the decoder 52 to set the mirror ratios. The present invention is not limited to the configuration. It is suffice to configure to set the mirror ratio according to the number of the stages of the battery monitoring ICs IC and the like. For example, other than the MCU (Memory Control Unit) 12, an external control unit may be provided for setting the mirror ratio. Alternatively, an external terminal may be set to select the mirror ratio in each of the battery monitoring ICs IC.

As described above, in the first and second embodiments, each of the battery monitoring ICs IC includes the first electrical current source 40 and the second electrical current source 42. Further, the first electrical current source 40 generates the first electrical current according to the power source electrical current supplied from the assembled battery BT connected thereto through the power source terminal 24, and outputs the first electrical current to the output terminal 30. Similarly, the second electrical current source 42 generates the second electrical current according to the external electrical current input from the battery monitoring IC at an upper stage through the input terminal 28, and outputs the second electrical current to the output terminal 30. It should be noted that the external load electrical current Iload supplied to the external load 14 becomes the sum of the first electrical current generated with the first electrical current source 40 of each of the battery monitoring ICs IC.

As described in the section of BACKGROUND OF THE INVENTION AND RELATED ART STATEMENT, the conventional battery monitoring IC generally includes only one electrical current source. More specifically, the conventional battery monitoring IC includes only the electrical current source corresponding to the first electrical current source 40 in the first and second embodiments. Accordingly, in the conventional battery monitoring IC, similar to the case when the switch S11 of the battery monitoring IC IC1 is turned off (refer to FIG. 4), the external load electrical current Iload is supplied only to the battery monitoring IC connected to the MCU (Memory Control Unit) 12. As a result, in the conventional battery monitoring IC, the electrical current consumption tends to fluctuate among the battery monitoring ICs, thereby causing the fluctuation in the voltage among the assembled batteries.

On the other hand, in the first and second embodiments, as opposed to the conventional battery monitoring IC disclosed in Patent Reference, it is possible to reduce the electrical current consumption of the battery monitoring ICs IC. For example, in the conventional battery monitoring IC, the conventional battery monitoring IC that is not communicating with the control unit (corresponding to the MCU (Memory Control Unit) 12) is discharged through a pull-down resistor, so that the conventional battery monitoring IC that is not communicating with the control unit consumes the electrical current similar to the conventional battery monitoring IC that is communicating with the control unit. Accordingly, it is possible to maintain the electrical current consumption of the conventional battery monitoring ICs at the same level.

As described above, in the conventional battery monitoring IC, each of the conventional battery monitoring ICs consumes the electrical current corresponding to the external load electrical current Iload. Accordingly, as compared with the battery monitoring system 10 in the first and second embodiments, the electrical current consumption of the conventional battery monitoring ICs tends to be large. As a result, in the conventional battery monitoring IC, the assembled battery BT tends to consume power thereof more quickly.

In the first and second embodiments, as opposed to the conventional battery monitoring IC disclosed in Patent Reference, it is possible to obtain the following effects. First, the conventional battery monitoring IC, the pull-down resistor is connected to the power source of the conventional battery monitoring IC. When the conventional battery monitoring IC is turned on, the pull-down resistor consumes the electrical current, thereby maintaining the electrical current consumption at the same level. Accordingly, in the conventional battery monitoring IC, when the external load electrical current Iload is supplied to the external load all the time, it is necessary to turn on the conventional battery monitoring IC all the time.

On the other hand, in the battery monitoring system 10 in the first and second embodiments, it is suffice that just the regulator circuit 22 is operating, and it is not necessary to operate all of the battery monitoring ICs IC. Accordingly, in the battery monitoring system 10 in the first and second embodiments, it is possible to minimize the electrical current consumption, and to reduce the fluctuation in the voltage of the assembled batteries BT.

In the first and second embodiments, it should be noted that the battery monitoring system 10 is configured such that the electrical current consumption consumed in each of the battery monitoring ICs IC is maintained at the same level. Accordingly, in the battery monitoring system 10, all of the battery monitoring ICs IC are configured to output the electrical current (the sum of the first electrical current and the first electrical current, or the first electrical current) to be the external load electrical current Iload. Alternatively, just some of the battery monitoring ICs IC in the battery monitoring system 10 may be configured to output the electrical current. More specifically, some of the battery monitoring ICs IC disposed at a specific number z of stages may be configured to output the external load electrical current Iload. In this case, the switches S1 to Sz−1 of the battery monitoring ICs IC including the battery monitoring IC IC1 at the lowest stage connected to the MCU (Memory Control Unit) 12 to the battery monitoring IC ICz−1 are turned on, and the switches of the battery monitoring ICs after the specific number z of the stages are turned off.

Further, in the first and second embodiments, it is possible to set the product of the mirror ratios (k×n×m) to an arbitrary number. Accordingly, it is possible to adjust an amount of the electrical current outputting from the battery monitoring ICs IC. It should be noted that it may be configured to adjust an amount of the electrical current according to the voltage of the assembled batteries BT and the like.

Further, in the first and second embodiments, the output terminal 30 of the battery monitoring IC at an upper stage is connected to the input terminal 28 of the battery monitoring IC at a lower stage, and the external load electrical current Iload is output from the regulator circuit 22 of the battery monitoring IC at a lower stage. It should be noted that the present invention is not limited to the configuration. Alternatively, when the battery monitoring IC has sufficient high voltage tolerance, the source terminals of the PMOS transistor MP3 and the PMOS transistor MP4 may be directly connected to the power source voltage VDD of the battery monitoring IC at an upper stage. With the alternative configuration, it is possible to obtain an effect similar to that in the first and second embodiments.

Further, the present invention is not limited to the number of the battery monitoring ICs IC (the number of the stages of the daisy chain arrangement) of the configuration in the first and second embodiments, and the number of the battery monitoring ICs IC is arbitrary.

Further, in the first and second embodiments, the MCU (Memory Control Unit) 12 is connected to the battery monitoring IC IC1 at the lowest stage, and the present invention is not limited to the configuration. Alternatively, the MCU (Memory Control Unit) 12 may be connected to the battery monitoring IC ICx at the highest stage.

Further, in the first and second embodiments, the semiconductor device is applied to the battery monitoring ICs IC for monitoring the battery voltage of the battery cells of the assembled batteries BT. The present invention is not limited thereto. Alternatively, the present invention may be applicable to any semiconductor device to which the power source voltage is supplied from the assembled battery and that outputs the voltage as the power source voltage of the external load 14.

Further, in the first and second embodiments, the configurations and the operations of the battery monitoring system 10, the battery monitoring ICs IC, and the MCU (Memory Control Unit) 12 are just examples. The present invention may be modified within the scope of the present invention.

The disclosure of Japanese Patent Application No. 2014-216648, filed on Oct. 23, 2014, is incorporated in the application by reference.

While the invention has been explained with reference to the specific embodiments of the invention, the explanation is illustrative and the invention is limited only by the appended claims.

What is claimed is:

1. A semiconductor device comprising:
a first electrical current source connected to an assembled battery through a power source terminal; and
a second electrical current source connected to an input terminal to which an external electrical current is input,
wherein said first electrical current source is configured to generate a first electrical current according to a reference voltage based on a power source electrical current input into the power source terminal, and to output the first electrical current to an output terminal,
said second electrical current source is configured to generate a second electrical current according to the reference voltage based on the external electrical current, and to output the second electrical current to the output terminal, and
said second electrical current source includes a switch for switching whether the second electrical current source generates the second electrical current.

2. The semiconductor device according to claim 1, wherein said first electrical current source includes a reference voltage source for supplying the reference voltage;
a first transistor having one of main terminals connected to the power source terminal;
a first resistor connected to another one of the main terminals;
a second resistor having one end portion connected to one end portion of the first resistor and other end portion connected to the reference voltage source; and
a differential amplifier having a first input terminal connected to the reference voltage source, a second input terminal connected to a connection point between the first resistor and the second resistor, and an output terminal connected to a control terminal of the first transistor.

3. The semiconductor device according to claim 1, wherein said second electrical current source includes a first current mirror circuit for outputting a third electrical current according to the power source voltage; and
a second current mirror circuit for receiving the third electrical current output from the first current mirror circuit, and for outputting the second electrical current to the output terminal according to the external electrical current.

4. The semiconductor device according to claim 1, wherein said first electrical current source includes a reference voltage source for supplying the reference voltage;
a first transistor having one of main terminals connected to the power source terminal;
a first resistor connected to another one of the main terminals;
a second resistor having one end portion connected to one end portion of the first resistor and other end portion connected to the reference voltage source;
a differential amplifier having a first input terminal connected to the reference voltage source, a second input terminal connected to a connection point between the first resistor and the second resistor, and an output terminal connected to a control terminal of the first transistor, and
said second electrical current source includes a first current mirror circuit for outputting a third electrical current according to the power source voltage;
a second current mirror circuit for receiving the third electrical current output from the first current mirror circuit, and for outputting the second electrical current to the output terminal according to the external electrical current;
a second transistor having one of main terminals connected to the power source terminal and another of the main terminals connected to the first current mirror circuit;
a third transistor connected to the second transistor;
a fourth transistor connected to the second transistor;
a fifth transistor connected to the fourth transistor; and
a sixth transistor connected to the fourth transistor.

5. The semiconductor device according to claim 4, wherein said first electrical current source and said second electrical current source are configured so that the following equation is satisfied $$m \times n \times k = 1$$

where m represents a ratio of an electrical current flowing through the first transistor relative to an electrical current flowing through the second transistor, n represents a ratio of an electrical current flowing through the third transistor relative to an electrical current flowing through the fourth transistor, and k represents a ratio of an electrical current flowing through the fifth transistor relative to an electrical current flowing through the sixth transistor.

6. The semiconductor device according to claim 1, wherein said output terminal is connected to an input terminal of another semiconductor device or an external device so that the semiconductor device is connected to the another semiconductor device or the external device in a daisy chain arrangement.

7. A battery monitoring system comprising:
said semiconductor device according to claim 4;
another semiconductor device having an input terminal connected to the output terminal of the semiconductor device; and
a control unit connected to the semiconductor device or the another semiconductor device,
wherein said control unit is configured to control the semiconductor device to maintain the first electrical current at a same level through adjusting values of m, n, and k where m represents a ratio of an electrical current flowing through the first transistor relative to an electrical current flowing through the second transistor, n represents a ratio of an electrical current flowing through the third transistor relative to an electrical current flowing through the fourth transistor, and k represents a ratio of an electrical current flowing through the fifth transistor relative to an electrical current flowing through the sixth transistor.

* * * * *